US011237461B2

United States Patent
Kasai et al.

(10) Patent No.: US 11,237,461 B2
(45) Date of Patent: Feb. 1, 2022

(54) TRANSPORT EQUIPMENT AND SENSOR BRACKET

(71) Applicant: HONDA MOTOR CO., LTD., Tokyo (JP)

(72) Inventors: Keita Kasai, Wako (JP); Takahiro Ohmoto, Wako (JP); Yasuyuki Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 16/665,038

(22) Filed: Oct. 28, 2019

(65) Prior Publication Data

US 2020/0192196 A1 Jun. 18, 2020

(30) Foreign Application Priority Data

Dec. 18, 2018 (JP) .............................. JP2018-236622

(51) Int. Cl.
*B60R 11/04* (2006.01)
*F16M 13/02* (2006.01)
(Continued)

(52) U.S. Cl.
CPC ............ *G03B 17/561* (2013.01); *B60R 11/04* (2013.01); *H04N 5/2252* (2013.01); (Continued)

(58) Field of Classification Search
CPC .................. G03B 17/561; B60R 11/04; B60R 2011/0026; H04N 5/2252; H04N 5/2253; F16M 13/02
(Continued)

(56) References Cited

U.S. PATENT DOCUMENTS 8,944,705 B1 * 2/2015 Matori ................... F16M 13/00
396/419
10,336,264 B2 * 7/2019 Okuda .................... B60R 11/04
(Continued)

FOREIGN PATENT DOCUMENTS

DE 102014224860 6/2016
JP 2002-341432 11/2002
(Continued)

OTHER PUBLICATIONS

Japanese Notice of Allowance for Japanese Patent Application No. 2018-236623 dated Jun. 16, 2020.
(Continued)

*Primary Examiner* — Jae N Noh
(74) *Attorney, Agent, or Firm* — Amin, Turocy & Watson, LLP

(57) ABSTRACT

A vehicle and a camera bracket include a lens hood which surrounds a detection space of an external environment detection camera, in which the lens hood includes a reflected wave reducing structure on at least a portion of a surface facing the detection space, and a bottom surface forming part which forms a surface (bottom surface) having the reflected wave reducing structure on the lens hood includes a fixed body having a portion (a fixed-side structure portion) of the reflected wave reducing structure and fixed to a vehicle main body, and a segment body having the other portion (a segment-side structure portion) of the reflected wave reducing structure and configured to be separable from the fixed body.

14 Claims, 10 Drawing Sheets

(51) Int. Cl.
G03B 17/56 (2021.01)
H04N 5/225 (2006.01)
B60R 11/00 (2006.01)

(52) U.S. Cl.
CPC .... H04N 5/2253 (2013.01); *B60R 2011/0026* (2013.01); *F16M 13/02* (2013.01)

(58) Field of Classification Search
USPC .......................................................... 348/148
See application file for complete search history.

(56) References Cited

U.S. PATENT DOCUMENTS

| | | | |
|---|---|---|---|
| 2005/0001901 A1* | 1/2005 | Eggers | B60R 11/04 348/118 |
| 2007/0041725 A1 | 2/2007 | Neumann et al. | |
| 2015/0015713 A1 | 1/2015 | Wang et al. | |
| 2015/0251605 A1 | 9/2015 | Uken et al. | |
| 2017/0240120 A1 | 8/2017 | Krug et al. | |
| 2019/0064636 A1 | 2/2019 | Kang et al. | |

FOREIGN PATENT DOCUMENTS

| | | |
|---|---|---|
| JP | 2005-022643 | 1/2005 |
| JP | 2015-509458 | 3/2015 |
| JP | 2017-171165 | 9/2017 |
| JP | 2017-171167 | 9/2017 |
| WO | 2014/141357 | 9/2014 |

OTHER PUBLICATIONS

Non-Final Office Action for U.S. Appl. No. 16/706,936 dated Aug. 5, 2020.
Final Office Action for U.S. Appl. No. 16/706,936 dated Mar. 25, 2021.
Japanese Office Action for Japanese Patent Application No. 2018-236622 dated Nov. 2, 2021.

* cited by examiner

TRANSPORT EQUIPMENT AND SENSOR BRACKET

CROSS-REFERENCE TO RELATED APPLICATION

Priority is claimed on Japanese Patent Application No. 2018-236622, filed Dec. 18, 2018, the content of which is incorporated herein by reference.

BACKGROUND OF THE INVENTION

Field of the Invention

The present invention relates to transport equipment and a sensor bracket.

Description of Related Art

Conventionally, there is transport equipment including a camera as an external environment detection sensor and a bracket which supports the camera on a transport equipment main body (see, for example, German Unexamined Patent Application, First Publication No. 102014224860). The bracket forms a lens hood of the camera. In the lens hood, a stray light shield (Stray Light Shield) is provided as a reflected wave reducing structure for inhibiting stray light.

SUMMARY OF THE INVENTION

Incidentally, in the above-described conventional configuration, a bottom surface portion of a lens hood in which a reflected wave reducing structure is provided is made attachable or detachable so that the inside of the lens hood can be accessed at the time of maintenance or the like.

However, cameras in recent years have had a wide viewing angle, and the bottom surface portion having the reflected wave reducing structure has been enlarged accordingly. In this case, parts to be attached and detached around the lens hood at the time of maintenance are increased in size, and there is a likelihood that maintenance work around the sensor hood cannot be readily performed.

An aspect according to the present invention has been made in consideration of such circumstances, and an objective of the present invention is to facilitate maintenance work around a sensor hood in transport equipment and sensor brackets in which a sensor hood having a reflected wave reducing structure is provided.

In order to solve the above-described problem and achieve the objective, the present invention employs the following aspects.

(1) Transport equipment according to one aspect of the present invention is transport equipment including an external environment detection sensor which detects electromagnetic waves, and a sensor bracket supported by a transport equipment main body, in which the sensor bracket includes a sensor hood which surrounds a detection space extending in a detection direction from a detection unit side of the external environment detection sensor, the sensor hood includes a reflected wave reducing structure which reduces reflected waves reaching the detection unit on at least a portion of a surface facing the detection space, and a surface forming part which forms a surface having the reflected wave reducing structure of the sensor hood includes a fixed body having a portion of the reflected wave reducing structure and fixed to the transport equipment main body, and a segment body having the other portion of the reflected wave reducing structure and configured to be separable from the fixed body.

According to the above-described aspect (1), since the bottom surface forming part having the reflected wave reducing structure includes the fixed body fixed to the transport equipment main body and the segment body separable from the fixed body, even when the inside of the sensor hood is accessed at the time of maintenance, the number of parts attached to and detached from the transport equipment main body can be fewer. That is, when an angle of view or a radiation/incident angle is extended due to performance improvement of the external environment detection sensor, since a width of the reflected wave reducing structure is also extended accordingly, there is a likelihood that the number of parts attached and detached is increased and thus workability is lowered in a configuration in which the entire surface forming part having the reflected wave reducing structure is attached and detached. In contrast, when the surface forming part having the reflected wave reducing structure includes the segment body that is separable from the fixed body, the number of parts attached and detached when the inside of the lens hood is accessed or the like can be fewer and workability can be improved.

(2) In the above-described aspect (1), the transport equipment main body may include a transmission member disposed in the detection direction of the external environment detection sensor and configured to transmit electromagnetic waves to be detected by the external environment detection sensor, and the sensor hood may be disposed on an inner surface of the transmission member and may include an opening in the detection direction that is closed by the inner surface of the transmission member.

According to the above-described aspect (2), even in a configuration in which the opening in the detection direction of the sensor hood is closed by the inner surface of the transmission member, since the segment body separable from the fixed body is provided, it is not necessary for the sensor bracket itself or large parts to be attached or detached when the inside of the sensor hood is accessed, and thereby maintenance workability around the sensor hood can be improved.

(3) In the above-described aspect (1) or (2), the external environment detection sensor may be fixed to the fixed body, the fixed body may include a first sensor fixing part and a second sensor fixing part which fix the external environment detection sensor, and the segment body may be disposed between the first sensor fixing part and the second sensor fixing part.

According to the above-described aspect (3), since the fixed body includes the first sensor fixing part and the second sensor fixing part that fix the external environment detection sensor and the segment body is disposed between the first sensor fixing part and the second sensor fixing part, even in a structure in which the segment body is provided in the sensor bracket, a portion (an opening part) at which the segment body is provided can be reinforced by fixing the external environment detection sensor and thus the segment body can be provided in a state in which a strength of the fixed body is maintained.

(4) In any one of the above-described aspects (1) to (3), the external environment detection sensor and the segment body may be disposed to overlap each other in a plan view of the surface forming part.

According to the above-described aspect (4), since the external environment detection sensor and the segment body are disposed to overlap each other in a plan view of the surface forming part, when the external environment detection sensor is attached to the fixed body, the segment body can be made difficult to come off. That is, since the external environment detection sensor overlaps the surface forming part that forms the surface of the sensor hood from the back surface side, coming-off of the segment body due to unintended disturbance received from the back surface side, that is, an outer side of the sensor hood can be inhibited.

(5) In the above-described aspect (3), the segment body may be attached to the fixed body from a back surface side of the surface forming part, the first sensor fixing part may include a first wall part extending to the back surface side of the surface forming part, the second sensor fixing part may include a second wall part extending to the back surface side of the surface forming part, and the segment body may be disposed between the first wall part and the second wall part.

According to the aspect (5), since the segment body can be attached to the fixed body using the first wall part and the second wall part as attachment guides, attachment workability of the segment body can be improved.

(6) In any one of the above-described aspects (1) to (5), the segment body may include fixed parts fixed to the fixed body, and the fixed parts may be formed to be weaker than fixing parts of the fixed body which fix the fixed parts.

According to the above-described aspect (6), since the segment body side has weaker strength than the fixed body side in the portion for fixing the segment body, even when the fixed portion is damaged when the segment body is removed from the fixed body or the like, the fixed body side does not break while the segment body side may break. Therefore, even when damage occurs to the fixed portion due to fixing of the fixed portion of the segment body or the like, the segment body can be removed while protecting the fixed body side. In a case in which a plurality of fixed parts are provided at least one of the fixed parts may be weaker than the corresponding fixing part.

(7) In any one of the above-described aspects (1) to (6), the segment body may include elastic deformation parts which are elastically deformed by being pressed by the fixed body in a state of being attached to the fixed body.

According to the above-described aspect (7), since the segment body is attached to the fixed body with the elastic deformation part elastically deformed, an elastic repulsive force can be applied to the engagement portion between the fixed body and the segment body and thereby rattling of the segment body can be suppressed.

Protruding part that press the elastic deformation parts may be provided on either the fixed body or the segment body.

(8) In the above-described aspect (7), the fixed body may include protruding parts which press and elastically deform the elastic deformation parts with the segment body attached.

According to the above-described aspect (8), since the protruding parts that elastically deform the elastic deformation parts are provided on the fixed body when the segment body is attached to the fixed body, unintended increase in the rigidity of the elastic deformation parts by the protruding parts is suppressed compared to a case in which the protruding parts are provided on the elastic deformation parts, the elastic deformation parts can be easily elastically deformed, and the attachment property of the segment body can be improved.

(9) In the above-described aspect (7) or (8), the segment body may include one side fixed parts which are fixed to the fixed body on one side of the segment body, the other side fixed parts which are elastically engaged with and fixed to the fixed body by being pressed from the back surface side of the surface forming part on the other side of the segment body, and pressing parts which enable the segment body to be pressed from the back surface side of the surface forming part in order to elastically deform the elastic deformation parts, in which the elastic deformation parts and the pressing parts may be disposed closer to the other side fixed parts than the one side fixed parts are.

According to the above-described aspect (9), since the elastic deformation parts and the pressing parts of the segment body are disposed in the vicinity of the other side fixed parts that are elastically engaged with the fixed body by being pressed from the back surface side of the surface forming part, if the pressing parts are pressed when the segment body is attached to the fixed body, a force to press the pressing parts can be efficiently used to enable the other side fixed parts to be engaged with and fixed to the fixed body and to elastically deform the elastic deformation parts, and thereby the attachment property of the segment body can be improved.

(10) In the above-described aspect (9), the other side fixed parts may engage with the fixed body to fix the segment body in a state in which the elastic deformation parts are elastically deformed by pressing of the pressing parts.

According to the above-described aspect (10), since the other side fixed parts are fixed to the fixed body in a state in which the elastic deformation parts of the segment body are elastically deformed by pressing of the pressing parts, the other side fixed parts and thus the segment body can be prevented from rattling and fixed to the fixed body.

(11) In the above-described aspect (10), the segment body may include a flat plate part having the reflected wave reducing structure on one surface in a thickness direction, and the elastic deformation parts may be provided on protruding wall parts which protrude in the thickness direction from the flat plate part toward the one surface side.

According to the above-described aspect (11), since the elastic deformation parts are provided on the protruding wall parts that protrude toward one surface side (the reflected wave reducing structure side) from the flat plate part having the reflected wave reducing structure, the elastic deformation parts can easily be pressed against the fixed body. Also, since the protruding parts are interposed between the elastic deformation parts and the flat plate part, elastic deformation of the elastic deformation parts does not easily reach the reflected wave reducing structure and thus the reflected wave reduction effect can be satisfactorily maintained.

(12) In any one of the above-described aspects (9) to (11), the segment body may include a flat plate part having the reflected wave reducing structure on one surface in a thickness direction, and the pressing parts may be provided to protrude in the thickness direction from the flat plate part toward the back surface side of the surface forming part.

According to the above-described aspect (12), since the pressing parts protruding from the flat plate part having the reflected wave reducing structure toward the back surface side of the surface forming part are provided, the pressing parts can easily be pressed when the segment body is attached from the back surface side, and the attachment workability of the segment body can be improved.

(13) In any one of the above-described aspects (1) to (12), the fixed body may include a fixed-side opening part which fits and closes the segment body, and an outer peripheral portion of the segment body may include an overlapping portion which overlaps an inner peripheral portion of the fixed-side opening part from a back surface side of the surface forming part.

According to the above-described aspect (13), since the outer peripheral portion of the segment body includes the overlapping portion that overlaps the inner peripheral portion of the fixed-side opening part from the back surface side of the surface forming part, the segment body can be prevented from falling into the fixed-side opening part when the segment body is attached. Also, when viewed from the surface side having the reflected wave reducing structure in a state in which the segment body is attached to the fixed-side opening part, since an overlap is formed between the outer peripheral portion of the segment body and the inner peripheral portion of the fixed-side opening part to eliminate generation of a gap, electromagnetic waves entering the inside of the sensor hood can be inhibited.

(14) A sensor bracket according to one aspect of the present invention is a sensor bracket supported by a transport equipment main body and includes a sensor hood which surrounds a detection space extending in a detection direction from a detection unit side of the external environment detection sensor which detects electromagnetic waves, in which the sensor hood includes a reflected wave reducing structure which reduces reflected waves reaching the detection unit on at least a portion of a surface facing the detection space, and a surface forming part which forms a surface having the reflected wave reducing structure of the sensor hood includes a fixed body having a portion of the reflected wave reducing structure and fixed to the transport equipment main body, and a segment body having the other portion of the reflected wave reducing structure and configured to be separable from the fixed body.

According to the aspects of the present invention, in the transport equipment and the sensor bracket having the sensor hood in which the reflected wave reducing structure is included, maintenance work around the sensor hood can be facilitated.

DETAILED DESCRIPTION OF THE INVENTION

Figure 1:
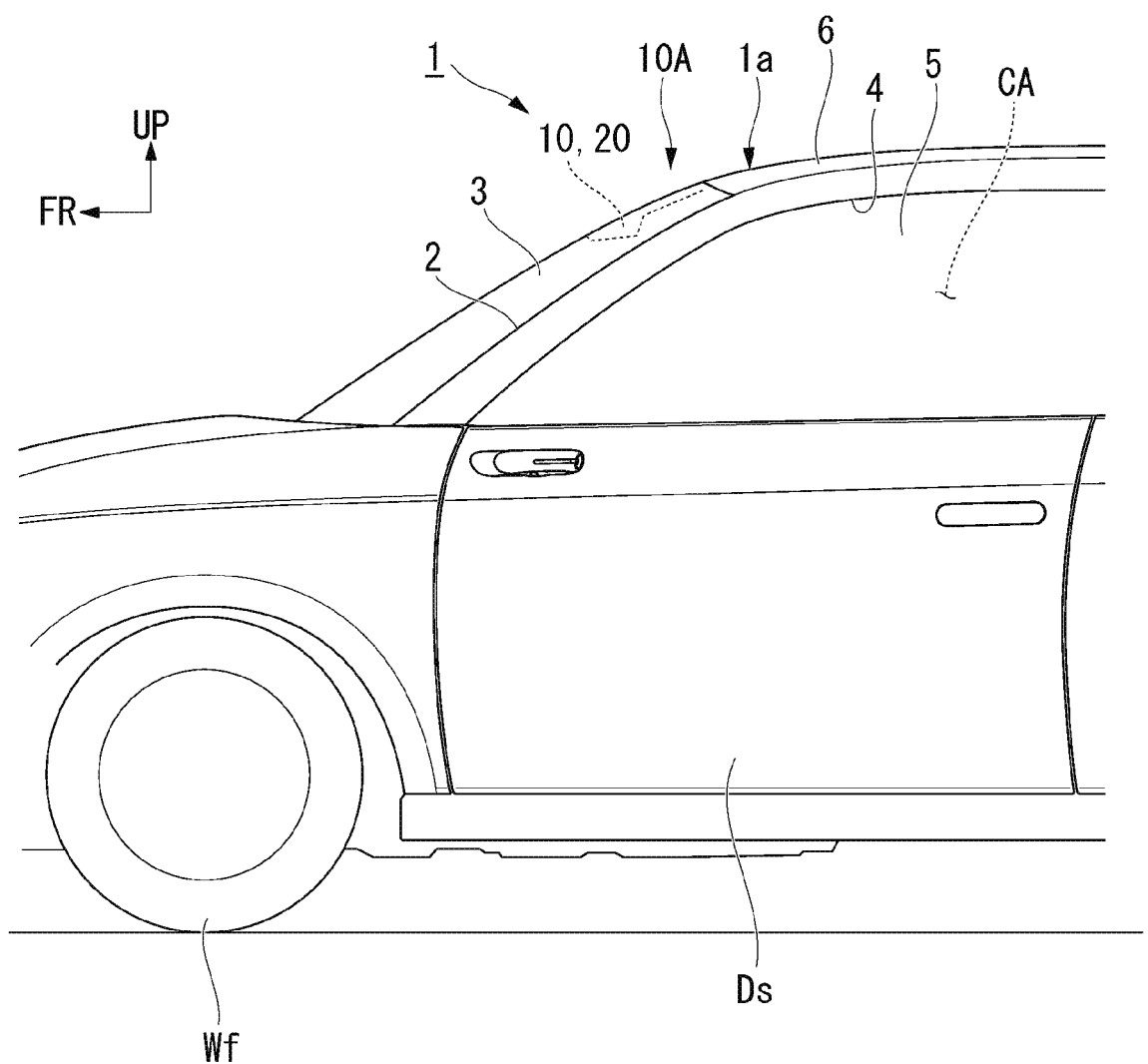
FIG. 1 is a left side view of a main portion of a vehicle in an embodiment of the present invention.

Hereinafter, embodiments of the present invention will be described with reference to the drawings. In the following description, directions such as forward, rearward, left, and right are the same as directions in a vehicle 1 to be described below unless otherwise specified. Also, an arrow FR indicating the front of the vehicle, an arrow LH indicating the left of the vehicle, and an arrow UP indicating an upper side of the vehicle, and a line CL1 indicating a vehicle left-right center are illustrated at suitable positions in the drawings used for the following description.

FIG. 1 is a left side view of a main portion of the vehicle 1 of the present embodiment.

As illustrated in FIG. 1, the vehicle (transport equipment) 1 of the present embodiment includes a front window (window) 2 and a front window glass (windshield) 3 in front of a passenger compartment CA, and includes a side window (window) 4 and a side window glass 5 on a lateral side of the passenger compartment CA.

Reference 6 denotes a roof above the passenger compartment CA, reference Wf denotes a front wheel, reference Ds denotes a side door, and reference 1a denotes a vehicle main body (transport equipment main body) 1a. The vehicle main body 1a of the present embodiment is a portion other than an external environment detection camera 10 and a camera bracket 20 of the vehicle 1 (an object to which the external environment detection camera 10 and the camera bracket 20 are attached).

The external environment detection camera 10 as an external environment detection sensor is installed on an inner surface 3a side (passenger compartment CA side) of an upper portion and a left-right central portion of the front window glass 3. The external environment detection camera 10 may be, for example, a digital camera utilizing a solid-state image sensing device such as a charge coupled device (CCD) or a complementary metal oxide semiconductor (CMOS). For example, the external environment detection camera 10 may periodically repeat imaging of the front of the vehicle. Information detected by the external environment detection camera 10 is used to recognize a position, a type, a speed, and the like of an object in a detection direction, and on the basis of this recognition, driving assist control, automatic driving control, and the like of the vehicle 1 are performed. Reference 10A denotes an attachment structure of the external environment detection sensor (camera).

Figure 2:
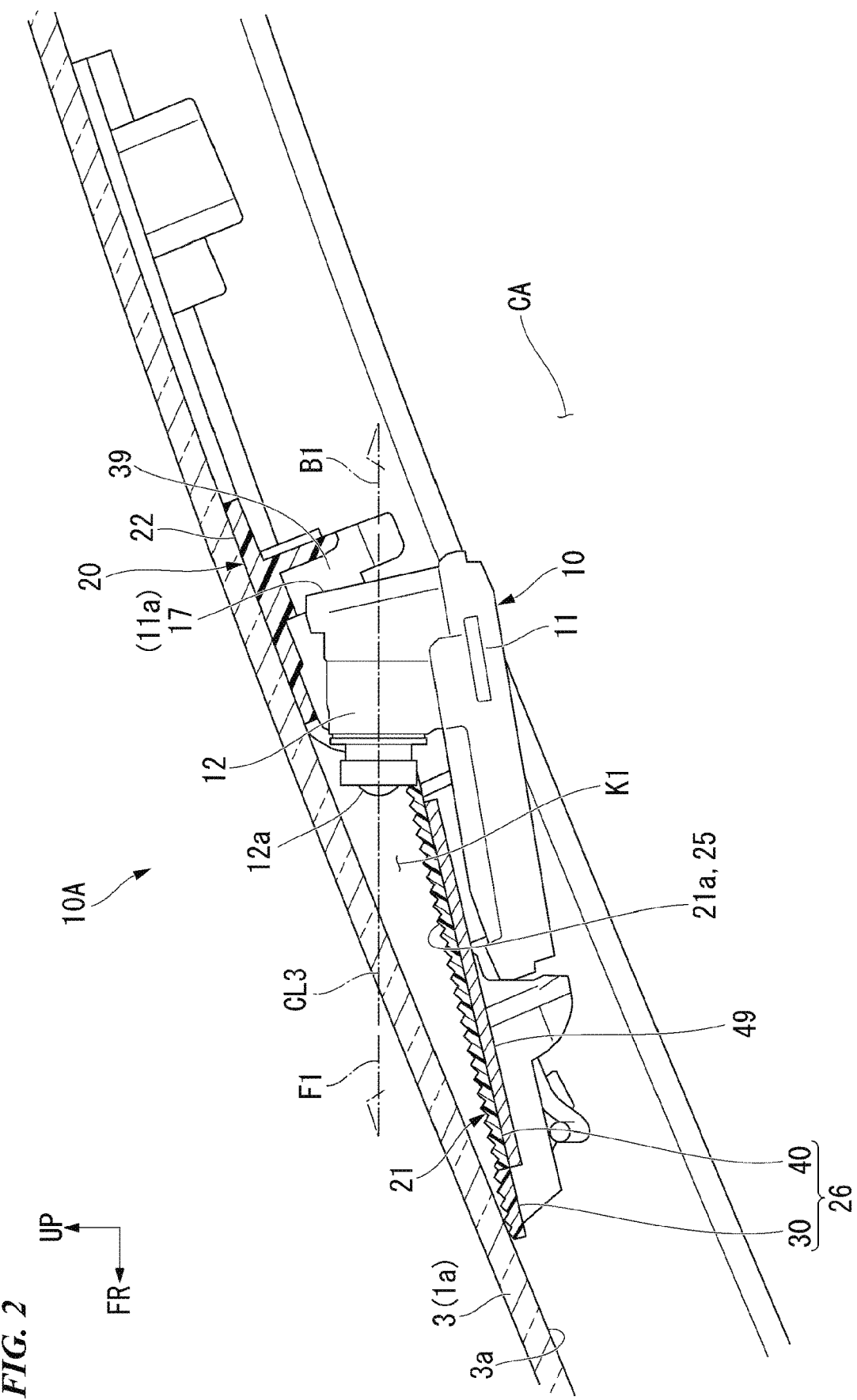
FIG. 2 is a left side view including a partial cross section around an external environment detection camera of the vehicle in the embodiment of the present invention.
Figure 3:
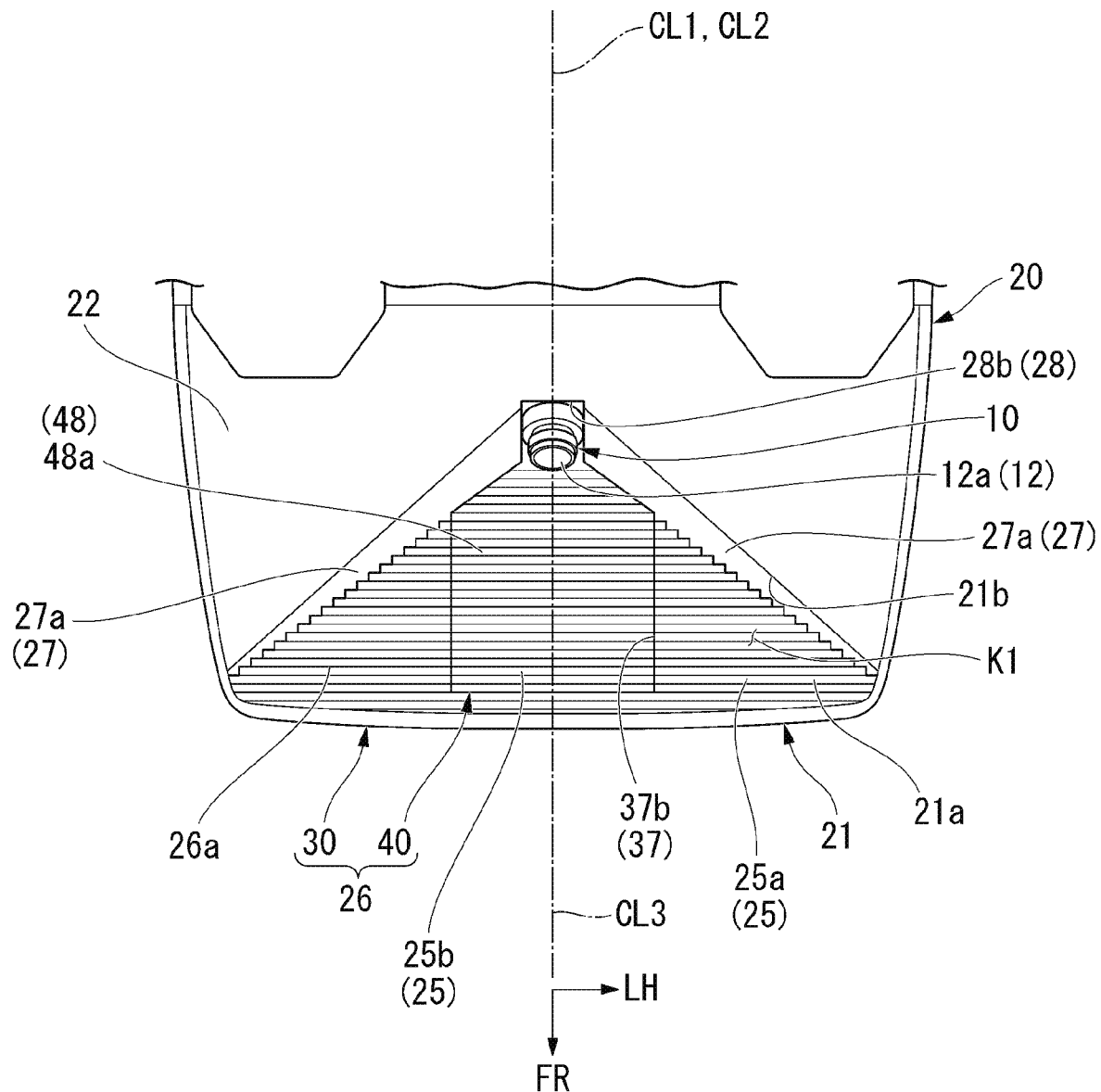
FIG. 3 is a plan view of a camera bracket which supports the external environment detection camera when viewed from a surface side.
Figure 4:
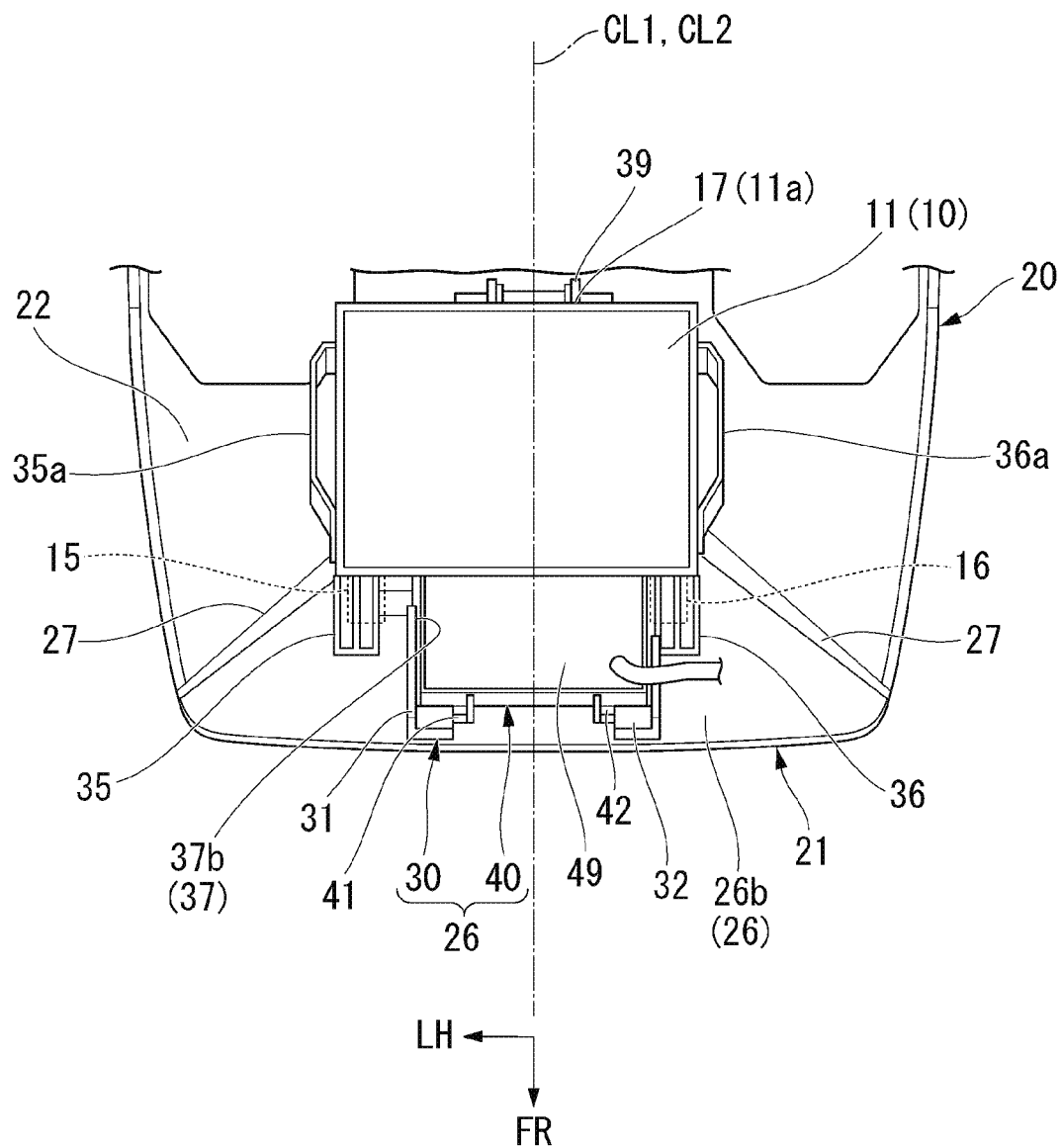
FIG. 4 is a plan view of the camera bracket which supports the external environment detection camera when viewed from a back surface side.

FIG. 2 is a left side view including a partial cross section around the external environment detection camera 10 of the vehicle 1, FIG. 3 is a plan view of the camera bracket 20 which supports the external environment detection camera 10 when viewed from a surface side (a bottom surface 26a side in a thickness direction of a bottom surface forming part 26 to be described below), and FIG. 4 is a plan view of the camera bracket 20 which supports the external environment detection camera 10 when viewed from a back surface side (a back surface 26b side in the thickness direction of the bottom surface forming part 26 to be described below). Further, covers for covering a vicinity of the external environment detection camera 10 from the passenger compartment side are not illustrated.

As illustrated in FIGS. 2 to 4, the external environment detection camera 10 includes a flat main body part 11 in which a thickness in the vertical direction is reduced, and a cylindrical lens 12 disposed on an upper side of a rear portion of the main body part 11.

The lens 12 is disposed with an optical axis CL3 as a central axis being substantially horizontal and a lens surface 12a facing the front of the vehicle (a detection direction). In FIG. 2, an arrow F1 indicates the detection direction along the optical axis CL3 of the external environment detection camera 10, and an arrow B1 indicates a direction opposite to the detection direction. In the present embodiment, the detection direction is one direction directed to the front of the vehicle, and the opposite direction is one direction directed to the rear of the vehicle. That is, in the optical axis direction which is bidirectional, one direction is the detection direction and the other direction is the opposite direction. The external environment detection camera 10 is configured to be substantially bilaterally symmetrical with respect to the optical axis CL3 in external appearance.

The external environment detection camera 10 is fixed to the inner surface 3a of the front window glass 3 that is inclined upward to the rear via the camera bracket 20. The camera bracket 20 is an injection-molded product made of, for example, a synthetic resin, and is affixed to the inner surface 3a of the front window glass 3 with an adhesive or the like. The camera bracket 20 is provided along an inclination of the front window glass 3, and the external environment detection camera 10 is attached to the camera bracket 20 from the passenger compartment side. A camera cover (not illustrated) covers a vicinity of the camera bracket 20 and the external environment detection camera 10 from the passenger compartment side.

Figure 9:
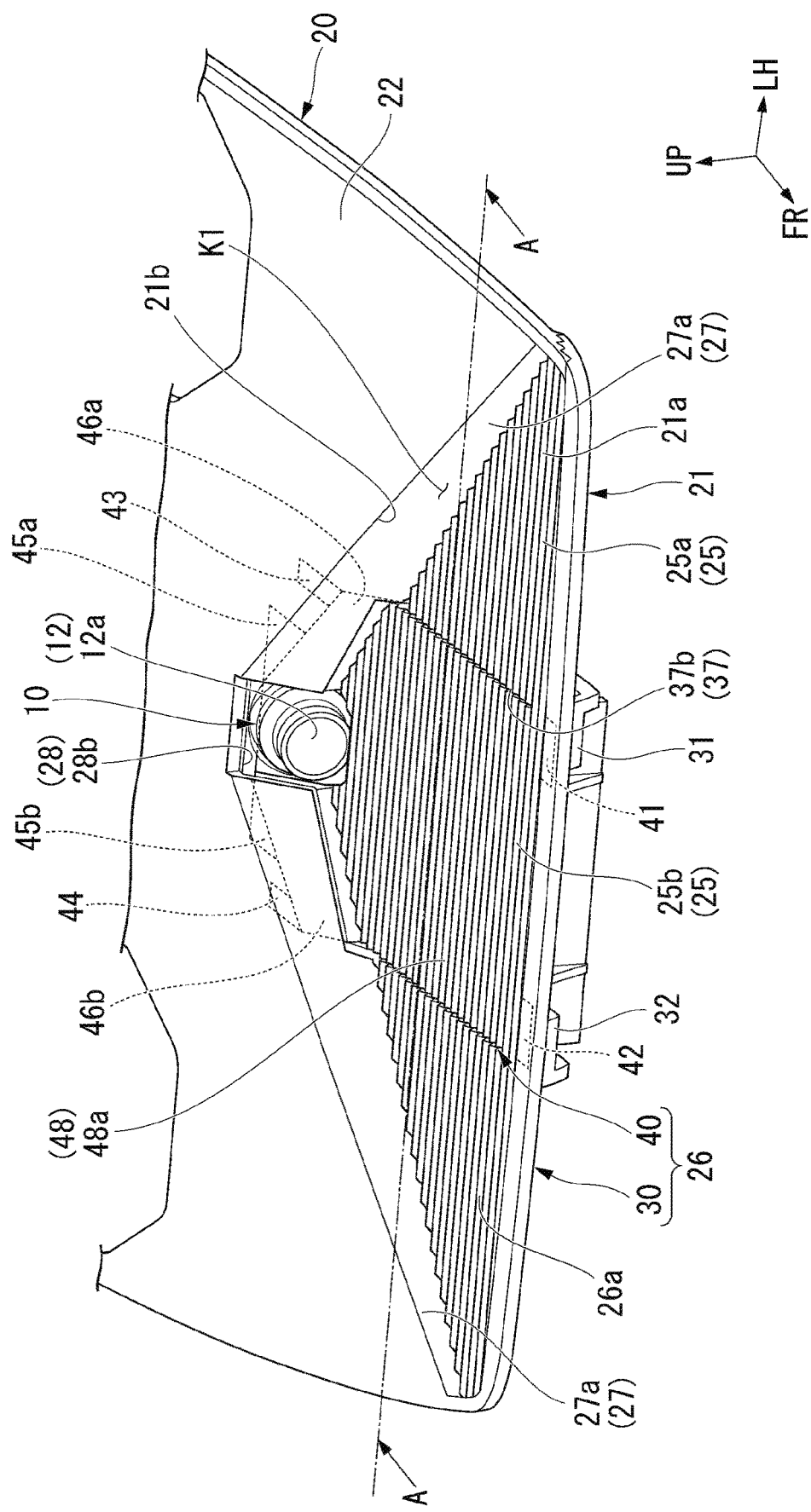
FIG. 9 is a perspective view of the camera bracket that supports the external environment detection camera.

Referring also to a perspective view of FIG. 9, a lens hood 21 surrounding a detection space K1 extending in the detection direction from the lens 12 side of the external environment detection camera 10 and an affixing part 22 affixed to the inner surface 3a of the front window glass 3 are integrally formed in the camera bracket 20. A lens opening part 28 that forms an opening 28b that exposes the lens 12 of the external environment detection camera 10 from the passenger compartment side into the lens hood 21 is provided at a substantially central portion of the camera bracket 20. The lens hood 21 is formed to extend a left-right width toward the front side from the lens opening part 28 to the front.

The lens hood 21 includes the bottom surface forming part 26 that forms the bottom surface 26a that faces the detection space K1 from below, and a side surface forming part 27 that forms a side surface 27a that faces the detection space K1 from left and right sides. The bottom surface 26a is parallel to a vehicle left-right direction and is a flat surface inclined downward to the front with respect to a vehicle front-rear direction and the optical axis CL3 in a side view. The bottom surface 26a and thus the bottom surface forming part 26 are formed in a triangular shape that extends the left-right width toward the front side in a plan view from a direction perpendicular to the bottom surface 26a. The term "in a plan view" of the present embodiment refers to viewing in a direction perpendicular to the bottom surface 26a unless otherwise specified, and the term "plan view" of the present embodiment refers to a plan view seen in a direction perpendicular to the bottom surface 26a unless otherwise specified. The bottom surface 26a is not limited to a flat surface in a strict sense and may be a reference plane (virtual plane) for forming (arranging) fine irregularities of a reflected wave reducing structure 25 to be described below. The side surface 27a and thus the side surface forming part 27 are formed to be bent and rise upward and rearward from left and right inclined side portions on both sides of the rear portion of the bottom surface forming part 26. The side surface 27a is formed to gradually reduce a height erected upward and rearward from left and right edge portions of the lens opening part 28 toward both left-right end portions of a front edge portion of the bottom surface forming part 26. A vertical width of the side surface 27a is smaller than the left-right width of the bottom surface 26a, and thus the lens hood 21 and the detection space K1 are formed in a flat shape in which the vertical width is reduced.

An upper surface portion of the lens hood 21 forms an opening 21b positioned in the detection direction of the external environment detection camera 10. The opening 21b is formed to be surrounded by an upper edge portion of the lens opening part 28, upper edge portions of the side surface forming parts 27 on the left and right sides, and the front edge portion of the bottom surface forming part 26. The opening 21b is closed by the inner surface 3a of the front window glass 3 in a state in which the lens hood 21 and thus the camera bracket 20 are fixed to the front window glass 3. The front window glass 3 is an example of a transmission member that is disposed in the detection direction of the external environment detection camera 10 and transmits light (electromagnetic waves) detected by the external environment detection camera 10.

The lens hood 21 includes the reflected wave reducing structure (stray light shield (SLS)) 25 that reduces reflected light (reflected wave) reaching the lens 12 on at least a portion (the bottom surface 26a in this embodiment) of a surface 21a (the bottom surface 26a and the left and right side surfaces 27a) facing the detection space K1. The reflected wave reducing structure 25 of the present embodiment may be formed such that, for example, a plurality of wave shapes having a triangular shaped cross section and extending along the left-right direction are aligned in the front-rear direction. Due to the reflected wave reducing structure 25, stray light (stray light, reflected waves) reaching the lens 12 of the external environment detection camera 10 is inhibited.

When the reflected wave reducing structure 25 having a three-dimensional shape such as a wave shape is provided, the bottom surface 26a is a reference plane (virtual plane) when the three-dimensional shape is formed. A plurality of pattern shapes such as the wave shape of the reflected wave reducing structure 25 are arranged along the reference plane. The pattern shape is not limited to one having a regular pitch and may have a predetermined change or may be irregular. Also, the pattern shape is not limited to a three-dimensional shape and may be one that has been subjected to a surface treatment such as embossing or painting. The reflected wave reducing structure 25 may be provided on the side surface 27a of the lens hood 21.

A line CL2 in FIGS. 3 and 4 indicates a left-right center of the camera bracket 20. The camera bracket 20 is configured to be substantially bilaterally symmetrical with respect to the line CL2. The left-right center CL2 of the camera bracket 20 is coincident with the vehicle left-right center CL1 in a plan view. The optical axis CL3 of the external environment detection camera 10 is coincident with the left-right center CL2 of the camera bracket 20 and the vehicle left-right center CL1 in a plan view. For example, when the external environment detection camera 10 is installed to be shifted from the vehicle left-right center CL1 or the like, the left-right center CL2 of the camera bracket 20 may be disposed to be shifted from the vehicle left-right center CL1, and the optical axis CL3 of the external environment detection camera 10 may be disposed to be shifted from the left-right center CL2 of the camera bracket 20.

Also, the camera bracket 20 and the external environment detection camera 10 may be configured to be bilaterally asymmetrical.

Referring to FIGS. 3 and 9, the bottom surface forming part 26 that forms the bottom surface 26a having the reflected wave reducing structure 25 of the lens hood 21 is divided into a fixed body 30 including a portion of the reflected wave reducing structure 25 (a fixed-side structure portion 25a) and fixed to the vehicle main body 1a (for example, the front window glass 3), and a segment body 40 that is configured to be separable from the fixed body 30 including the remaining other portion (a segment-side structure portion 25b) of the reflected wave reducing structure 25. The fixed body 30 has the affixing part 22 integrally formed therein and can be regarded as the integral fixed body 30 having the affixing part 22.

Referring to FIGS. 4 to 8 together, the segment body 40 is provided in a substantially rectangular range that overlaps the optical axis CL3 in a plan view. Specifically, a flat plate part 48 (see FIGS. 7 and 8) that forms a schematic shape of the segment body 40 in a plan view includes a front side portion 40a1 extending in the vehicle left-right direction, left and right side portions 40a2 extending in the vehicle front-rear direction, left and right rear inclined side portions 40a3 extending obliquely to be positioned forward toward the sides outward to the left and right, and a rear central notch portion 40a4 formed between inner ends of the left and right rear inclined side portions 40a3. A fixed-side opening part 37 that forms a substantially rectangular opening 37b matching the segment body 40 is provided in the fixed body 30. In a state in which the segment body 40 is attached to the fixed-side opening part 37, the fixed body 30 and the segment body 40 are disposed such that surfaces thereof constituting the bottom surface 26a are coplanar with each other or parallel to each other. When the reflected wave reducing structure 25 is provided on the side surface 27a of the lens hood 21, the segment body 40 including a portion of the side surface forming part 27 may be provided.

The external environment detection camera 10 is attached to the fixed body 30 side (the back surface 26b side) of the bottom surface forming part 26. In the external environment detection camera 10, a first sensor fixed part 15 is provided to protrude toward the front on the left side of a front end portion of the main body part 11, and a second sensor fixed part 16 is provided to protrude toward the front on the right side of the front end portion of the main body part 11. On the back surface 26b of the bottom surface forming part 26, a first sensor fixing part 35 corresponding to the first sensor fixed part 15 is provided to protrude downward on the left side of the fixed-side opening part 37, and a second sensor fixing part 36 corresponding to the second sensor fixed part 16 is provided to protrude downward on the right side of the fixed-side opening part 37.

The first sensor fixed part 15 and the second sensor fixed part 16 move rearward (while moving toward the rear) along the back surface 26b of the bottom surface forming part 26 to be inserted into the first sensor fixing part 35 and the second sensor fixing part 36. Thereby, the first sensor fixed part 15 and the second sensor fixed part 16 are in an unfastened engagement state with the first sensor fixing part 35 and the second sensor fixing part 36. The term "unfastened engagement state" in the present embodiment means that they are coupled without using a fastening member such as a bolt or a nut. Further, this may be substituted with a structure coupled using a fastening member. When the external environment detection camera 10 bridges between the first sensor fixing part 35 and the second sensor fixing part 36, deterioration in rigidity of the fixed body 30 due to provision of the fixed-side opening part 37 is suppressed.

A third sensor fixed part 17 is provided at a left-right central portion of a rear end portion 11a of the main body part 11 of the external environment detection camera 10. On the back surface 26b of the bottom surface forming part 26, a third sensor fixing part 39 corresponding to the third sensor fixed part 17 is provided to the rear of the fixed-side opening part 37. The third sensor fixed part 17 is elastically engaged with the third sensor fixing part 39 when the rear end portion 11a of the main body part 11 moves to approach the bottom surface forming part 26 from below. Thereby, the third sensor fixed part 17 and the third sensor fixing part 39 are in an unfastened engagement state.

The external environment detection camera 10 is attached to the fixed body 30 of the camera bracket 20 by the respective engagements between the sensor fixed parts 15 to 17 and the sensor fixing parts 35, 36, and 39. The external environment detection camera 10 overlaps the segment body 40 in a plan view.

Figure 5:
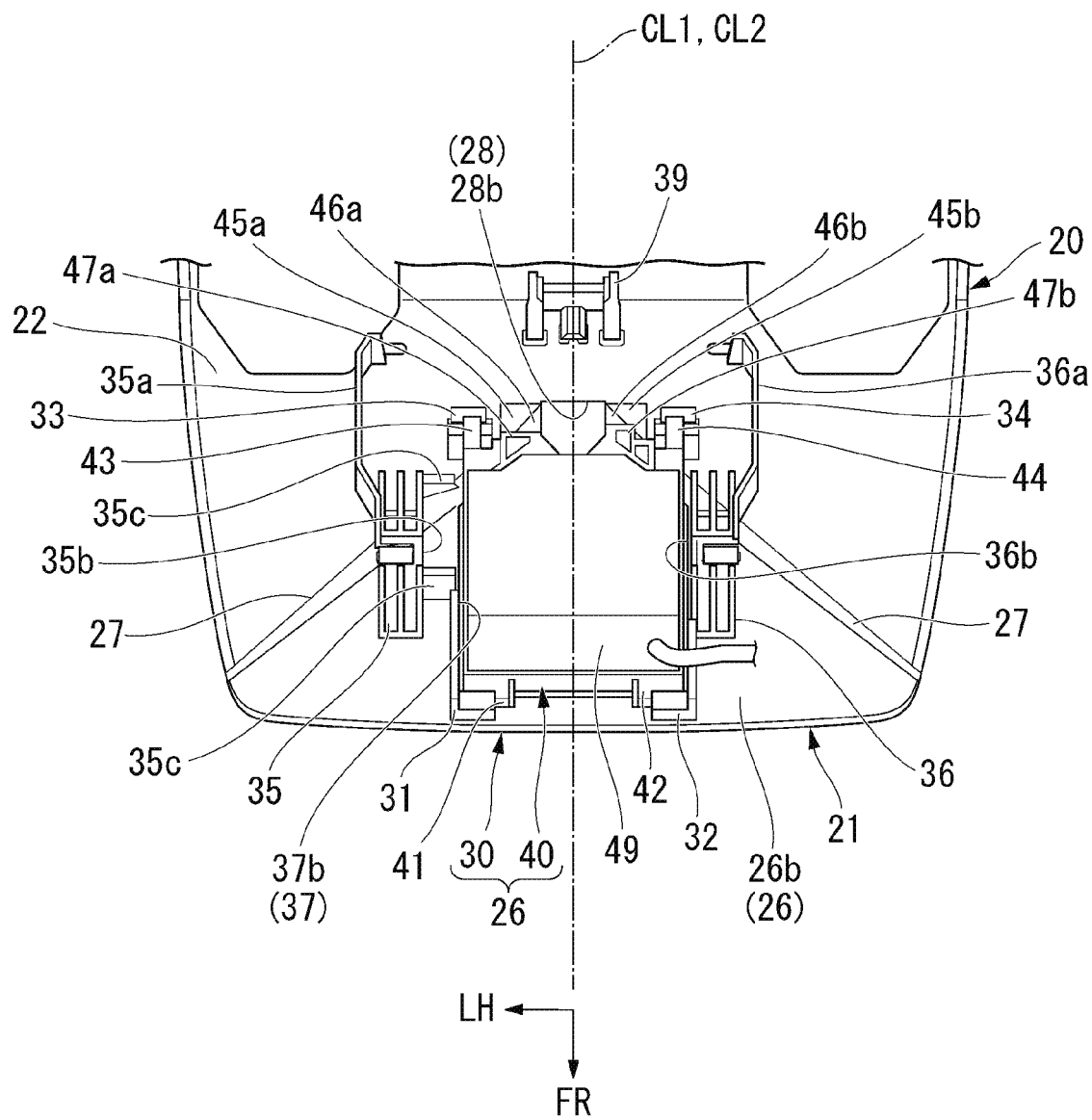
FIG. 5 is a plan view of a state in which the external environment detection camera is removed from FIG. 4.
Figure 6:
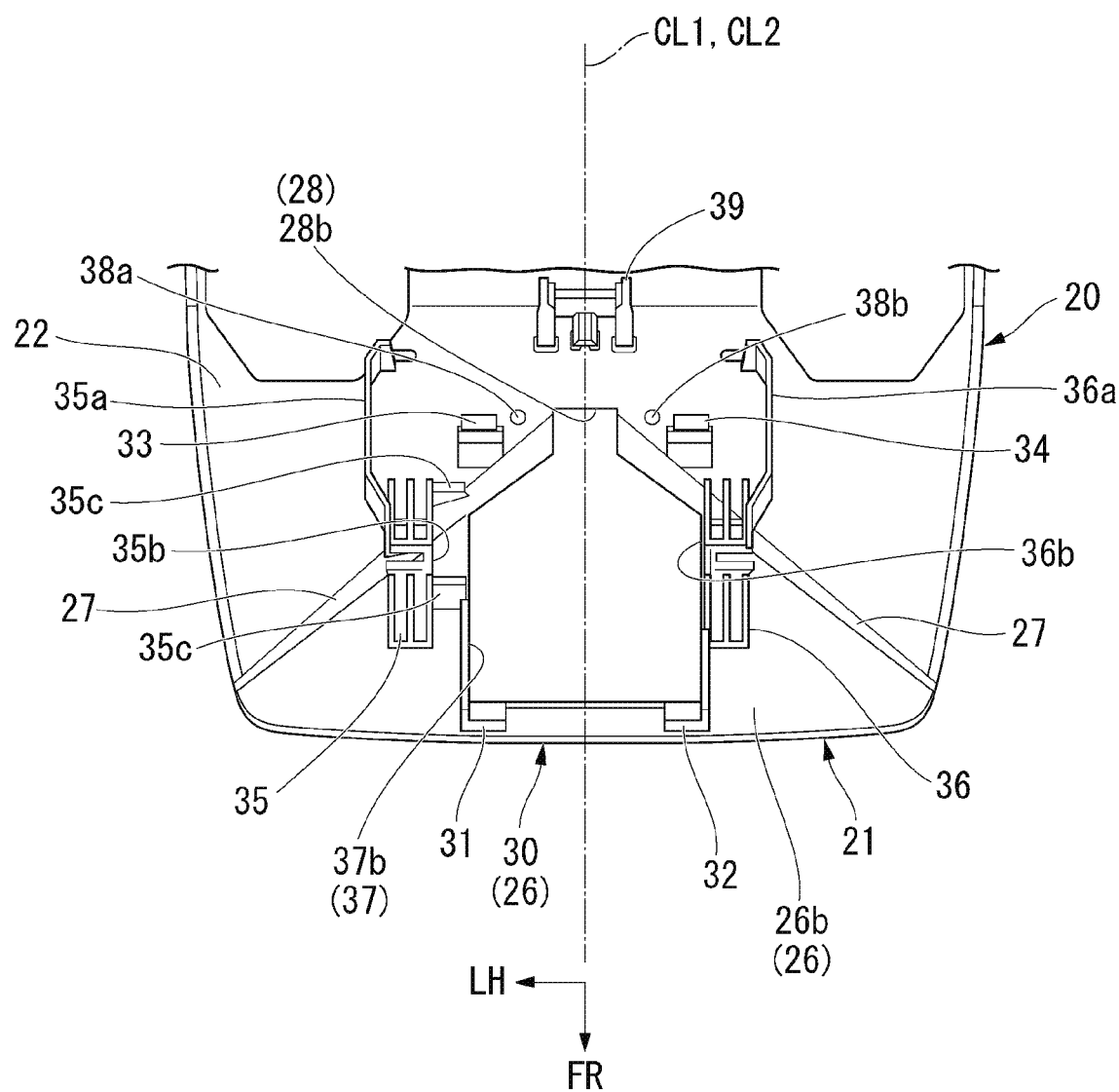
FIG. 6 is a plan view of a state in which a segment body is removed from FIG. 5.

FIG. 5 is a plan view of a state in which the external environment detection camera 10 is removed from FIG. 4, and FIG. 6 is a plan view of a state in which the segment body 40 is removed from FIG. 5.

As illustrated in FIGS. 4 to 6, on the back surface (the back surface 26b) of the camera bracket 20, a first rearward extending wall part 35a and a second rearward extending wall part 36a respectively extending along portions on left and right sides of the main body part 11 of the external environment detection camera 10 are provided to stand upright behind the first sensor fixing part 35 and the second sensor fixing part 36. The first rearward extending wall part 35a and the second rearward extending wall part 36a are erected in an overlapping direction (stacking direction) of the front window glass 3, the fixed body 30, and the external environment detection camera 10. The first rearward extending wall part 35a and the second rearward extending wall part 36a function as guides when the external environment detection camera 10 is attached. The main body part 11 of the external environment detection camera 10 is slightly bilaterally asymmetrical, and the first sensor fixing part 35 and the second sensor fixing part 36 are disposed to be also slightly bilaterally asymmetrical accordingly.

A first wall part 35b and a second wall part 36b extending in the vehicle front-rear direction are respectively provided at inner portions on left and right sides of the first sensor fixing part 35 and the second sensor fixing part 36. The first wall part 35b and the second wall part 36b are also erected in the stacking direction. The first wall part 35b and the second wall part 36b function as guides when the segment body 40 is attached. For example, a pair of front and rear ribs 35c may be provided on left and right inner sides of the first wall part 35b. The front and rear ribs 35c have left and right inner ends which are brought into close proximity with a left edge of the segment body 40, and the front and rear ribs 35c serve as attachment guides on the left side of the segment body 40.

Figure 7:
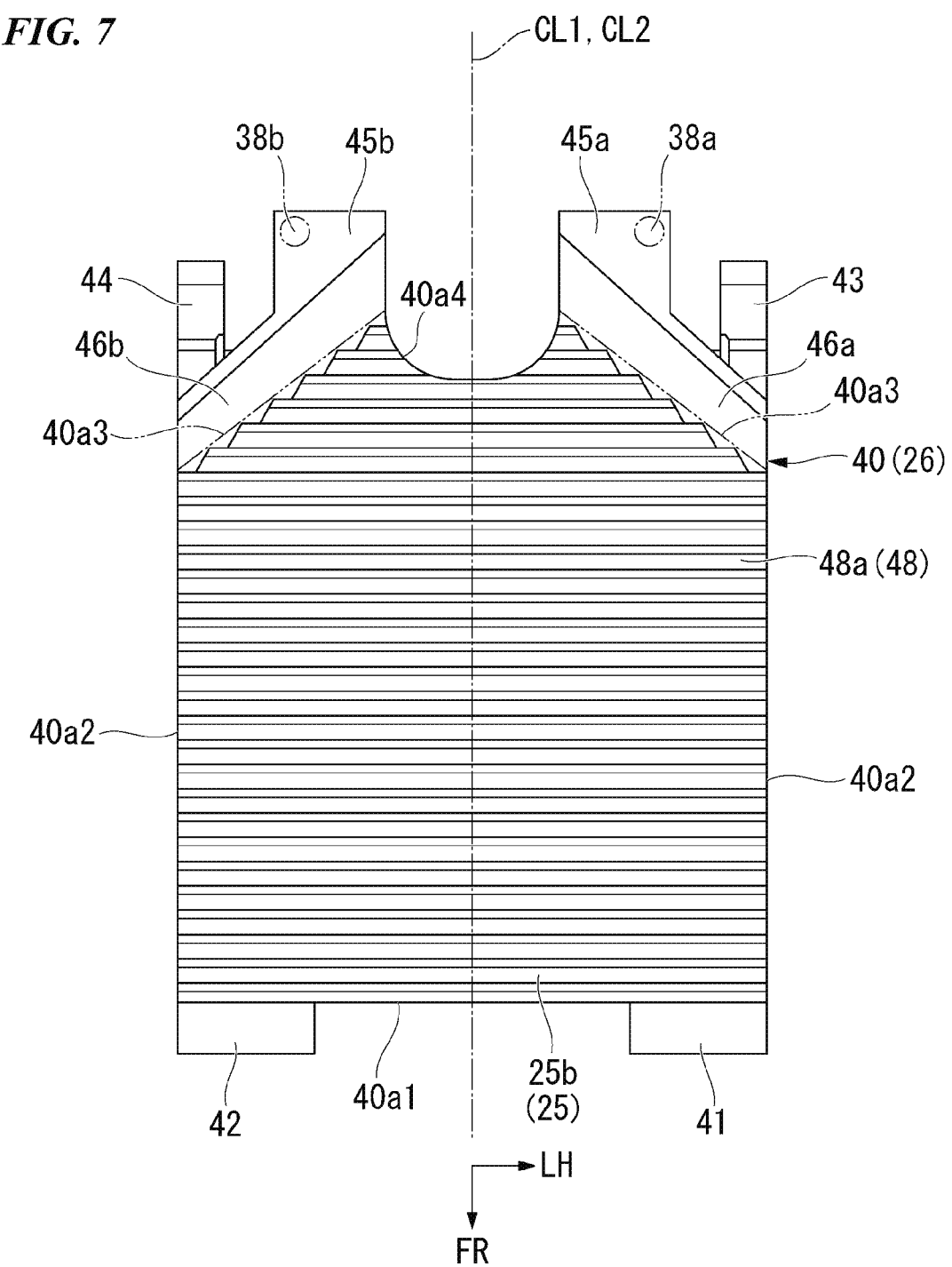
FIG. 7 is a plan view of the segment body when viewed from the surface side.
Figure 8:
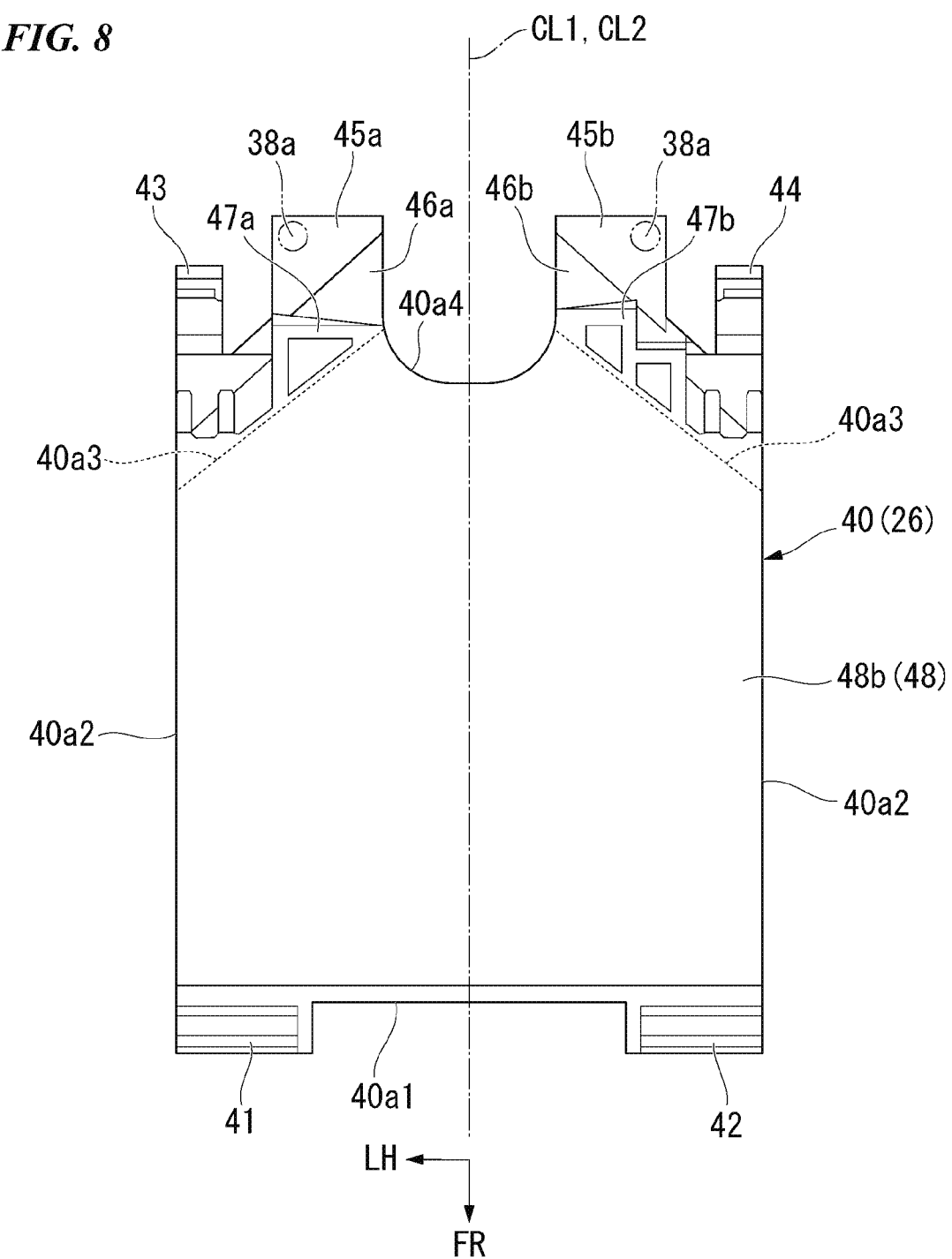
FIG. 8 is a plan view of the segment body when viewed from the back surface side.

FIG. 7 is a plan view of the segment body 40 when viewed from the surface side (a surface 48a side of the flat plate part 48, and the bottom surface 26a side), and FIG. 8 is a plan view of the segment body 40 when viewed from the back surface side (a back surface 48b side of the flat plate part 48, and the back surface 26b side).

Referring to FIGS. 7 and 8, the segment body 40 includes the flat plate part 48 having the reflected wave reducing structure 25 on one surface (the surface 48a) in a thickness direction. The flat plate part 48 includes the front side portion 40a1, the left and right side portions 40a2, the left and right rear inclined side portion 40a3, and the rear central notch portion 40a4 on an outer peripheral portion (referred to as an outer peripheral portion 40a of the segment body 40) in a plan view.

The front side portion 40a1 is formed at a front end portion of the flat plate part 48 and extends in the vehicle left-right direction in a plan view.

The left and right side portions 40a2 are formed at left and right end portions of the flat plate part and extend in the vehicle front-rear direction in a plan view.

The left and right rear inclined side portions 40a3 are formed at left and right rear end portions of the flat plate part and extend obliquely to be positioned forward toward the sides outward to the left and right in a plan view.

The rear central notch portion 40a4 is formed between the inner ends of the left and right rear inclined side portions 40a3 on rear left and right inner sides of the segment body 40 and has a semicircular shape that is convex forward in a plan view.

A first fixed part 41 and a second fixed part 42 protrude toward the front from portions on left and right sides of the front side portion 40a1. On the back surface 26b of the bottom surface forming part 26, a first fixing part 31 and a second fixing part 32 corresponding to the first fixed part 41 and the second fixed part 42 are respectively provided to protrude downward on the side in front of the fixed-side opening part 37. The first fixed part 41 and the second fixed part 42 are moved forward along the back surface 26b of the bottom surface forming part 26 to be inserted into the first fixing part 31 and the second fixing part 32, respectively. Thereby, the first fixed part 41 and the second fixed part 42 are in an unfastened engagement state with the first fixing part 31 and the second fixing part 32.

Here, the first fixed part 41 and the second fixed part 42 which are portions to be fixed on the segment body 40 side are formed to be weaker than the first fixing part 31 and the second fixing part 32 which are fixing portions on the fixed body 30 side. That is, the first fixed part 41 and the second fixed part 42 are formed to be weaker by at least one of, for example, providing a thin portion, a notch or the like, or making materials thereof different from those of the first fixing part 31 and the second fixing part 32. Thereby, when the segment body 40 is removed from the fixed body 30 or the like, even in a case in which these fixed portions are damaged, the fixed body 30 side can be protected due to breakage of the segment body 40 side.

A first protruding wall part 46a and a second protruding wall part 46b are erected toward the surface 48a side of the flat plate part 48 from the left and right rear inclined side portions 40a3, respectively. The protruding wall parts 46a and 46b are respectively formed to be bent upward and rearward and rise from the rear inclined side portions 40a3. The protruding wall parts 46a and 46b are respectively disposed to overlap back sides of the side surface forming parts 27 on the left and right sides of the fixed body 30. The protruding wall parts 46a and 46b form erected distal end portions substantially parallel to the rear inclined side portion 40a3 in a plan view. The protruding wall parts 46a and 46b are inclined with respect to a direction perpendicular to the surface 48a of the flat plate part 48 and formed substantially parallel to the side surface forming parts 27. The protruding wall part 46a and 46b are formed so that inner ends thereof on left and right inner sides are in the vehicle front-rear direction in a plan view. The inner ends of the protruding wall parts 46a and 46b are connected to left and right front ends of the rear central notch portion 40a4.

On the left and right inner sides of the erected distal end portions of the protruding wall parts 46a and 46b, a first elastic deformation piece 45a and a second elastic deformation piece 45b, which are substantially parallel to the surface 48a of the flat plate part 48, are respectively provided to protrude toward the side to the rear and outwardly to the left and right. Each of the elastic deformation pieces 45a and 45b is formed in a triangular shape in a plan view and includes a rear side portion extending in the vehicle left-right direction in a plan view and an outer side portion extending in the vehicle front-rear direction in a plan view. Inner ends of the elastic deformation pieces 45a and 45b are continuous to the inner ends of the protruding wall parts 46a and 46b, and these are linearly formed in the vehicle front-rear direction until they reach the left and right front ends of the rear central notch portion 40a4 in a plan view.

On the back surface 26b of the bottom surface forming part 26, a first protruding part 38a and a second protruding part 38b corresponding to the elastic deformation pieces 45a and 45b are provided to protrude on a rear side of the fixed-side opening part 37. The elastic deformation pieces 45a and 45b are pressed by the protruding parts 38a and 38b of the fixed body 30 toward a side away from the fixed body 30. Thereby, engagements between a third fixed part 43 and a fourth fixed part 44, and a third fixing part 33 and a fourth fixing part 34, which will be described below, is strengthened, and a rear end portion of the segment body 40 is firmly fixed to the fixed body 30 without rattling.

On left and right outer sides of the erected distal end portions of the protruding wall parts 46a and 46b, the third fixed part 43 and the fourth fixed part 44 are respectively provided to protrude rearward while being spaced apart from left and right outer sides of the elastic deformation pieces 45a and 45b. On the back surface 26b of the bottom surface forming part 26, the third fixing part 33 and the fourth fixing part 34 corresponding to the third fixed part 43 and the fourth fixed part 44 are respectively provided to protrude downward on the rear side of the fixed-side opening part 37. When the rear end portion of the segment body 40 moves to approach the fixed body 30 from below, the third fixed part 43 and the fourth fixed part 44 are elastically engaged with the third fixing part 33 and the fourth fixing part 34. Thereby, the third fixed part 43 and the fourth fixed part 44 are in an unfastened engagement state with the third fixing part 33 and the fourth fixing part 34.

Since the third fixed part 43 and the fourth fixed part 44 are separated from the elastic deformation pieces 45a and 45b with a space therebetween, elastic deformation on one side cannot easily affect elastic deformation on the other side.

Here, the third fixed part 43 and the fourth fixed part 44 are also formed to be weaker than the corresponding third fixing part 33 and fourth fixing part 34. As a result, even in a case in which damage occurs when the segment body 40 is removed from the fixed body 30 or the like, the fixed body 30 side can be protected due to breakage of the segment body 40 side.

A first pressing part 47a and a second pressing part 47b which form pressing surfaces on the same plane with the back surface 48b of the flat plate part 48 are respectively provided to protrude on the back surface side of the protruding wall parts 46a and 46b. The pressing parts 47a and 47b respectively protrude rearward from the back surfaces of the protruding wall parts 46a and 46b and form the pressing surfaces in a triangular shape or the like in a plan view in front of the elastic deformation pieces 45a and 45b. A hollowed-out portion that opens to the back surface 48b side is appropriately formed at each of the pressing parts 47*a* and 47*b*. The pressing parts 47*a* and 47*b* are slightly bilaterally asymmetrical with respect to each other. Except for the pressing parts 47*a* and 47*b*, the segment body 40 is configured to be bilaterally symmetrical. The external environment detection camera 10 and the camera bracket 20 are likely to be laterally asymmetrical when used in different types of vehicles and sensor dispositions but can be easily used in a compatible manner when the segment body 40 is bilaterally symmetrical.

Here, the elastic deformation pieces 45*a* and 45*b* and the pressing parts 47*a* and 47*b* are disposed closer to the third fixed part 43 and the fourth fixed part 44 with respect to the first fixed part 41 and the second fixed part 42. Accordingly, when the pressing parts 47*a* and 47*b* are pressed when the segment body 40 is attached to the fixed body 30, the third fixed part 43 and the fourth fixed part 44 can be easily engaged with the fixed body 30, and the elastic deformation pieces 45*a* and 45*b* can be easily elastically deformed. For example, a sheet shaped heater 49 may be attached to the back surface 48*b* of the segment body 40. Functional components to be attached to the segment body 40 are not limited to the heater 49, and may be, for example, a room lamp, a car speaker, or the like.

<Regarding Gap in Reflected Wave Reducing Structure>

Figure 10:
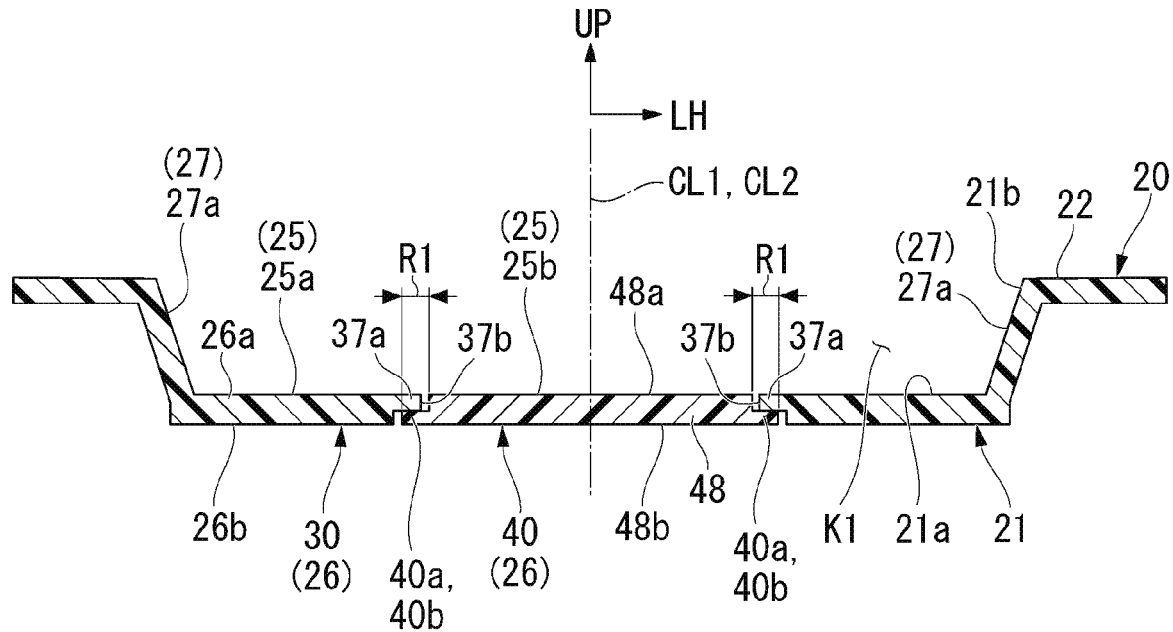
FIG. 10 is a cross-sectional view taken along line A-A in FIG. 9 and is a cross-sectional view illustrating a first example of an overlapping structure of the segment body and a fixed body.

FIG. 10 is a cross-sectional view taken along line A-A in FIG. 9 and illustrates a first example of an overlapping structure of the segment body 40 and the fixed body 30 described above.

When a gap is generated between the outer peripheral portion 40*a* of the segment body 40 and an inner peripheral portion 37*a* of the fixed-side opening part 37, light enters the lens hood 21 from the gap and becomes stray light, thereby affecting a detection accuracy of the external environment detection camera 10.

As illustrated in FIG. 10, in the present embodiment, an overlap (overlapping margin R1) is formed between the outer peripheral portion 40*a* of the segment body 40 and the inner peripheral portion 37*a* of the fixed-side opening part 37 in a direction along the back surface 26*b* of the bottom surface forming part 26. That is, the outer peripheral portion 40*a* of the segment body 40 includes an overlapping portion 40*b* that overlaps the inner peripheral portion 37*a* of the fixed-side opening part 37 from the back surface 26*b* side of the bottom surface forming part 26.

In the example of FIG. 10, the outer peripheral portion 40*a* of the segment body 40 and the inner peripheral portion 37*a* of the fixed-side opening part 37 have a staircase-like cross-sectional shape in which they are meshed with each other. The term "staircase-like cross-sectional shape in which they are meshed with each other" defines a position of the segment body 40 in a direction perpendicular to the back surface 26*b* of the bottom surface forming part 26 when the segment body 40 is fitted into the fixed-side opening part 37 from the back surface 26*b* side, and is a cross-sectional shape in which a surface including the segment-side structure portion 25*b* of the segment body 40 is disposed in parallel with a surface including the fixed-side structure portion 25*a* of the fixed body 30. In the direction along the back surface 26*b* of the bottom surface forming part 26, a gap is formed around the segment body 40 to allow a component tolerance or the like of the segment body 40 so that the segment body 40 is easily fitted into the fixed-side opening part 37.

Figure 11:
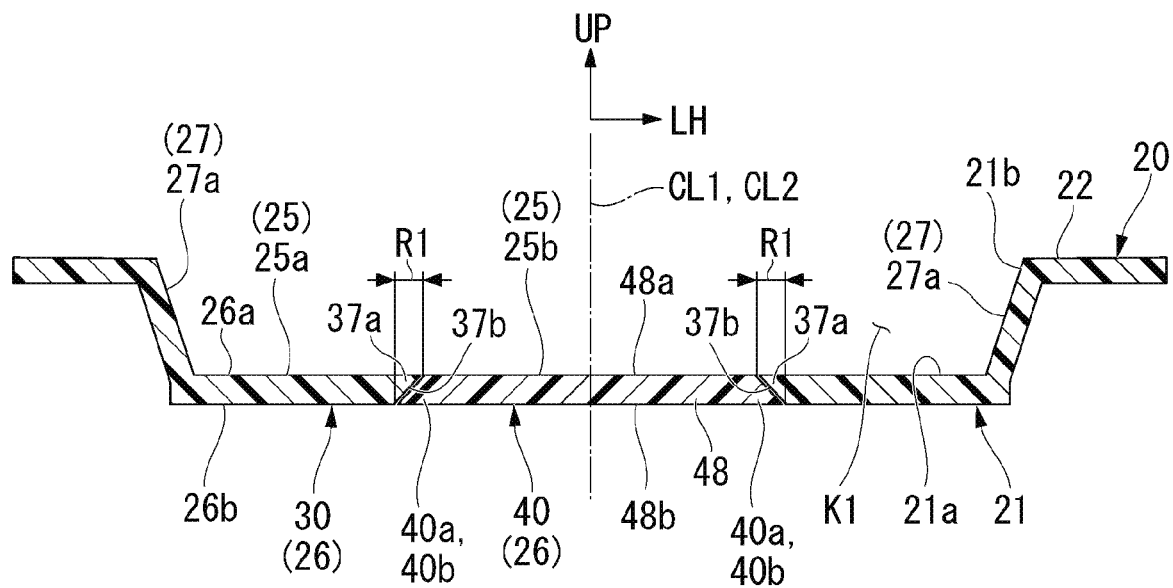
FIG. 11 is a cross-sectional view taken along line A-A in FIG. 9, and is a cross-sectional view illustrating a second example of an overlapping structure of the segment body and the fixed body.

FIG. 11 is a cross-sectional view taken along line A-A of FIG. 9 and illustrates a second example of the overlapping structure of the segment body 40 and the fixed body 30.

The cross-sectional shape in which the outer peripheral portion 40*a* of the segment body 40 and the inner peripheral portion 37*a* of the fixed-side opening part 37 are caused to overlap is not limited to the staircase-like cross-sectional shape described above and, for example, as illustrated in FIG. 11, the outer peripheral portion 40*a* of the segment body 40 and the inner peripheral portion 37*a* of the fixed-side opening part 37 may have an inclined cross-sectional shape in which they are meshed with each other. Also in this case, an overlap R1 is formed between the outer peripheral portion 40*a* of the segment body 40 and the inner peripheral portion 37*a* of the fixed-side opening part 37 in a direction along the back surface 26*b* of the bottom surface forming part 26. That is, the outer peripheral portion 40*a* of the segment body 40 includes the overlapping portion 40*b* that overlaps the inner peripheral portion 37*a* of the fixed-side opening part 37 from the back surface 26*b* side of the bottom surface forming part 26.

In the examples of FIGS. 10 and 11, it can be said that an edge on the bottom surface 26*a* of the fixed-side opening part 37 is on an inner side of the fixed-side opening part 37 with respect to an edge on the back surface 26*b* of the segment body 40. If this condition is satisfied, the overlapping structure of the segment body 40 and the fixed body 30 is not limited to the examples of FIGS. 10 and 11. As described above, when the segment body 40 and the fixed body 30 are disposed not to generate a gap therebetween in a direction along the surface (the bottom surface 26*a*) having the reflected wave reducing structure 25, even in a case in which the reflected wave reducing structure 25 is a divided structure, light entering the inside of the lens hood 21 can be inhibited.

As described above, the vehicle 1 of the above-described embodiment includes the external environment detection camera 10 and the camera bracket 20 that supports the external environment detection camera 10 on the vehicle main body 1*a*, in which the camera bracket 20 includes the lens hood 21 that surrounds the detection space K1 extending in a detection direction F1 from a detection unit (the lens 12) side of the external environment detection camera 10, the lens hood 21 includes the reflected wave reducing structure 25 that reduces reflected light reaching the detection unit on at least a portion of the surface 21*a* facing the detection space K1, and the bottom surface forming part 26 that forms a surface (the bottom surface 26*a*) having the reflected wave reducing structure 25 of the lens hood 21 includes the fixed body 30 having a portion (the fixed-side structure portion 25*a*) of the reflected wave reducing structure 25 and fixed to the vehicle main body 1*a*, and the segment body 40 having the other portion (the segment-side structure portion 25*b*) of the reflected wave reducing structure 25 and configured to be separable from the fixed body 30.

Also, the camera bracket 20 in the above-described embodiment which supports the external environment detection camera 10 on the vehicle main body 1*a* includes the lens hood 21 that surrounds the detection space K1 extending in the detection direction F1 from the detection unit (the lens 12) side of the external environment detection camera 10, the lens hood 21 includes the reflected wave reducing structure 25 that reduces reflected light reaching the detection unit on at least a portion of the surface 21*a* facing the detection space K1, and the bottom surface forming part 26 that forms the surface (the bottom surface 26*a*) having the reflected wave reducing structure 25 of the lens hood 21 includes the fixed body 30 having a portion (the fixed-side structure portion 25*a*) of the reflected wave reducing structure 25 and fixed to the vehicle main body 1a, and the segment body 40 having the other portion (the segment-side structure portion 25b) of the reflected wave reducing structure 25 and configured to be separable from the fixed body 30.

According to this configuration, since the bottom surface forming part 26 having the reflected wave reducing structure 25 includes the fixed body 30 fixed to the vehicle main body 1a and the segment body 40 separable from the fixed body 30, even when the inside of the lens hood 21 is accessed at the time of maintenance, the number of parts attached to and detached from the vehicle main body 1a can be fewer. That is, when an angle of view (a viewing angle, a radiation/incident angle in a case of a radio wave sensor) is extended due to performance improvement of the external environment detection camera 10 (achieving a wider angle), since a width of the reflected wave reducing structure 25 is also extended accordingly, there is a likelihood that the number of parts attached and detached is increased and thus workability is lowered in a configuration in which the entire bottom surface forming part 26 having the reflected wave reducing structure 25 is attached and detached. In contrast, when the bottom surface forming part 26 having the reflected wave reducing structure 25 includes the segment body 40 that is separable from the fixed body 30, the number of parts attached and detached when the inside of the lens hood 21 is accessed or the like can be fewer and workability can be improved.

In the vehicle 1 of the above-described embodiment, the vehicle main body 1a includes the front window glass 3 disposed in the detection direction F1 of the external environment detection camera 10 and configured to transmit light to be detected by the external environment detection camera 10, and the lens hood 21 is fixed to the inner surface 3a of the front window glass 3 and includes the opening 21b in the detection direction F1 that is closed by the inner surface 3a of the front window glass 3.

According to this configuration, even in a configuration in which the opening 21b in the detection direction F1 of the lens hood 21 is closed by the inner surface 3a of the front window glass 3, since the segment body 40 separable from the fixed body 30 is provided, it is not necessary for the camera bracket 20 itself or large parts to be attached or detached when the inside of the lens hood 21 is accessed, and thereby maintenance workability around the lens hood 21 can be improved.

In the vehicle 1 of the above embodiment, the external environment detection camera 10 is fixed to the fixed body 30, the fixed body 30 includes the first sensor fixing part 35 and the second sensor fixing part 36 that fix the external environment detection camera 10, and the segment body 40 is disposed between the first sensor fixing part 35 and the second sensor fixing part 36.

According to this configuration, since the fixed body 30 includes the first sensor fixing part 35 and the second sensor fixing part 36 that fix the external environment detection camera 10 and the segment body 40 is disposed between the first sensor fixing part 35 and the second sensor fixing part 36, even in a structure in which the segment body 40 is provided in the camera bracket 20, a portion (the fixed-side opening part 37) at which the segment body 40 is provided can be reinforced by fixing the external environment detection camera 10 and thus the segment body 40 can be provided in a state in which a strength of the fixed body 30 is maintained.

In the vehicle 1 of the above-described embodiment, the external environment detection camera 10 and the segment body 40 are disposed to overlap each other in a plan view of the bottom surface forming part 26.

According to this configuration, since the external environment detection camera 10 and the segment body 40 are disposed to overlap each other in a plan view of the bottom surface forming part 26, when the external environment detection camera 10 is attached to the fixed body 30, the segment body 40 can be made difficult to come off. That is, since the external environment detection camera 10 overlaps the bottom surface forming part 26 that forms the surface (the bottom surface 26a) of the lens hood 21 from the back surface 26b side, coming-off of the segment body 40 due to unintended disturbance received from the back surface 26b side, that is, an outer side of the lens hood 21 can be inhibited.

In the vehicle 1 of the embodiment, the segment body 40 is attached to the fixed body 30 from the back surface 26b side of the bottom surface forming part 26, the first sensor fixing part 35 includes the first wall part 35b extending to the back surface 26b side of the bottom surface forming part 26, the second sensor fixing part 36 includes the second wall part 36b extending to the back surface 26b side of the bottom surface forming part 26, and the segment body 40 is disposed between the first wall part 35b and the second wall part 36b.

According to this configuration, since the segment body 40 can be attached to the fixed body 30 using the first wall part 35b and the second wall part 36b as attachment guides, attachment workability of the segment body 40 can be improved.

In the vehicle 1 of the above-described embodiment, the segment body 40 includes the first fixed part 41 to the fourth fixed part 44 which are fixed to the fixed body 30, and the first fixed part 41 to the fourth fixed part 44 are formed to be weaker than the first fixing part 31 to the fourth fixing part 34 of the fixed body 30 which fix the first fixed part 41 to the fourth fixed part 44.

According to this configuration, since the segment body 40 side has weaker strength than the fixed body 30 side in the portion for fixing the segment body 40, even when the fixed portion is damaged when the segment body 40 is removed from the fixed body 30 or the like, the fixed body 30 side does not break while the segment body 40 side may break. Therefore, even when damage occurs to the fixed portion due to fixing of the fixed portion of the segment body 40 or the like, the segment body 40 can be removed while protecting the fixed body 30 side. Further, at least one of the plurality of fixed parts 41 to 44 may be weaker than the corresponding fixing parts 31 to 34.

In the vehicle 1 of the above-described embodiment, the segment body 40 includes the elastic deformation pieces 45a and 45b which are elastically deformed by being pressed by the protruding parts 38a and 38b provided on the fixed body 30 in a state of being attached to the fixed body 30.

According to this configuration, the segment body 40 is attached to the fixed body 30 with the elastic deformation pieces 45a and 45b elastically deformed, the protruding parts 38a and 38b that elastically deform the elastic deformation pieces 45a and 45b are provided on the fixed body 30, and thereby unintended increase in the rigidity of the elastic deformation pieces 45a and 45b by the protruding parts is suppressed compared to a case in which the protruding parts are provided on the elastic deformation pieces 45a and 45b, the elastic deformation pieces 45a and 45b can be easily elastically deformed, and the attachment property of the segment body 40 can be improved.

In the vehicle 1 according to the above-described embodiment, the segment body 40 includes the first fixed part 41 and the second fixed part 42 that are fixed to the fixed body 30 on one side of the segment body 40, the third fixed part 43 and the fourth fixed part 44 that are elastically engaged with and fixed to the fixed body 30 by being pressed from the back surface 26b side of the bottom surface forming part 26 on the other side of the segment body 40, and the pressing parts 47a and 47b that enable the segment body 40 to be pressed from the back surface 26b side of the bottom surface forming part 26 in order to elastically deform the elastic deformation pieces 45a and 45b, in which the elastic deformation pieces 45a and 45b and the pressing parts 47a and 47b are disposed closer to the third fixed part 43 and the fourth fixed part 44 with respect to the first fixed part 41 and the second fixed part 42.

According to this configuration, since the elastic deformation pieces 45a and 45b and the pressing parts 47a and 47b of the segment body 40 are disposed in the vicinity of the third fixed part 43 and the fourth fixed part 44 that are elastically engaged with the fixed body 30 by being pressed from the back surface 26b side of the bottom surface forming part 26, if the pressing parts 47a and 47b are pressed when the segment body 40 is attached to the fixed body 30, a force to press the pressing parts 47a and 47b can be efficiently used to enable the third fixed part 43 and the fourth fixed part 44 to be engaged with and fixed to the fixed body 30 and to elastically deform the elastic deformation pieces 45a and 45b, and thereby the attachment property of the segment body 40 can be improved.

In the vehicle 1 of the above-described embodiment, the third fixed part 43 and the fourth fixed part 44 engage with the fixed body 30 to fix the segment body 40 in a state in which the elastic deformation pieces 45a and 45b are elastically deformed by pressing of the pressing parts 47a and 47b.

According to this configuration, since the third fixed part 43 and the fourth fixed part 44 are fixed to the fixed body 30 in a state in which the elastic deformation pieces 45a and 45b of the segment body 40 are elastically deformed by the pressing of the pressing parts 47a and 47b, the third fixed part 43 and the fourth fixed part 44 and thus the segment body 40 can be prevented from rattling and fixed to the fixed body 30.

In the vehicle 1 of the above-described embodiment, the segment body 40 includes the flat plate part 48 having the reflected wave reducing structure 25 on the surface 48a in the thickness direction, and the elastic deformation pieces 45a and 45b are provided on the protruding wall parts 46a and 46b that protrude in the thickness direction from the flat plate part 48 toward the surface 48a side.

According to this configuration, since the elastic deformation pieces 45a and 45b are provided on the protruding wall parts 46a and 46b that protrude toward the surface 48a side (the reflected wave reducing structure 25 side) from the flat plate part 48 having the reflected wave reducing structure 25, the elastic deformation pieces 45a and 45b can easily be pressed against the fixed body 30. Also, since the protruding wall parts 46a and 46b are interposed between the elastic deformation pieces 45a and 45b and the flat plate part 48, elastic deformation of the elastic deformation pieces 45a and 45b does not easily reaches the reflected wave reducing structure 25 and thus the reflected wave reduction effect can be satisfactorily maintained.

In the vehicle 1 in the above-described embodiment, the segment body 40 includes the flat plate part 48 having the reflected wave reducing structure 25 on one surface in the thickness direction, and the pressing parts 47a and 47b are provided to protrude in the thickness direction from the flat plate part 48 toward the back surface 26b side of the bottom surface forming part 26.

According to this configuration, since the pressing parts 47a and 47b protruding from the flat plate part 48 having the reflected wave reducing structure 25 toward the back surface 26b side of the bottom surface forming part 26 are provided, the pressing parts 47a and 47b can easily be pressed when the segment body 40 is attached from the back surface 26b side, and the attachment workability of the segment body 40 can be improved.

In the vehicle 1 of the above-described embodiment, the fixed body 30 includes the fixed-side opening part 37 that fits and closes the segment body 40, and the outer peripheral portion 40a of the segment body 40 includes the overlapping portion 40b that overlaps the inner peripheral portion 37a of the fixed-side opening part 37 from the back surface 26b side of the bottom surface forming part 26.

According to this configuration, since the outer peripheral portion 40a of the segment body 40 includes the overlapping portion 40b that overlaps the inner peripheral portion 37a of the fixed-side opening part 37 from the back surface 26b side of the bottom surface forming part 26, the segment body 40 can be prevented from falling into the fixed-side opening part 37 when the segment body 40 is attached. Also, when viewed from the surface (the bottom surface 26a) side having the reflected wave reducing structure 25 in a state in which the segment body 40 is attached to the fixed-side opening part 37, since an overlap is formed between the outer peripheral portion 40a of the segment body 40 and the inner peripheral portion 37a of the fixed-side opening part 37 to eliminate generation of a gap, light entering the inside of the lens hood 21 can be inhibited.

Further, the present invention is not limited to the above-described embodiment, and for example, the camera bracket 20 is not limited to a configuration in which it is fixed to the front window glass 3 and may be fixed to the vehicle main body other than the front window glass 3 such as, for example, a roof or a front pillar. In this case, the camera bracket 20 may be configured to cause the lens hood 21 to extend in the detection direction F1 (front window glass 3 side) from a position of the camera bracket 20 fixed to the vehicle main body. The lens hood 21 may be configured to be disposed close to the front window glass 3 without being in contact therewith. The opening 21b of the lens hood 21 is not limited to a configuration in which it is in contact with the front window glass 3 to be completely sealed and may be configured to be disposed and closed with a slight gap with respect to the front window glass 3. The lens hood 21 is not limited to one fixed to the front window glass 3 (transmission member). The vehicle 1 is not limited to the configuration in which the external environment detection camera 10 is supported by the camera bracket 20 and may be configured such that the camera bracket 20 is supported by the external environment detection camera 10. In this case, it can be said that the fixed body 30 is indirectly fixed to the vehicle main body 1a.

The external environment detection sensor is not limited to one that is installed in the window in front of the passenger compartment to detect the front of the vehicle, and may be a sensor that is installed on a window on a lateral side of the passenger compartment to detect the lateral side of the vehicle, or may be a sensor that is installed on a window behind the passenger compartment to detect the rear of the vehicle. The transmission member disposed in the detection direction of the external environment detection sensor is not limited to a window member such as a windshield provided as the window of the passenger compartment, and may be a transmission member disposed in a detection direction of a sensor installation location when, for example, the sensor is installed on an inner side of an exterior part or the like. The transmission member disposed in the detection direction of the external environment detection sensor is not limited to glass and may be made of a resin or the like. In a case of transport equipment such as a motorcycle that does not have a passenger compartment, an installation location of the external environment detection sensor may be a transmission member such as a cowl screen instead of the window member.

For example, the camera may be a camera that captures not only visible light but also invisible light such as infrared rays. Not only an optical sensor such as a camera but also an infrared ray sensor or a radio wave sensor such as a radar using microwaves such as millimeter waves, or the like may be used. Regarding the disposition of the lens of the camera in the above-described embodiment, it becomes a disposition of an antenna in a case of radar. A configuration including a plurality of sensors such as a stereo camera may be used instead of a single sensor. A configuration using a camera and a radar in combination may also be used.

The vehicle 1 according to the embodiment is an example of the transport equipment, and a vehicle as the transport equipment to which the present invention is applied is not limited to a passenger car and also includes a cargo vehicle, and furthermore, the present invention is not limited to a vehicle having a passenger compartment and also includes a small saddle-type vehicle such as a motorcycle. The vehicle is a vehicle such as a two-wheeled vehicle, a three-wheeled vehicle, or a four-wheeled vehicle, and a driving source thereof is an internal combustion engine such as a gasoline engine or a diesel engine, an electric motor, or a combination thereof. The electric motor operates using electric power generated by a generator connected to an internal combustion engine, or discharge power of a secondary battery or a fuel cell. Also, the transport equipment includes bicycles, railways, ships, airplanes, and the like.

The configuration in the above-described embodiment is an example of the present invention, and various changes can be made without departing from the scope of the present invention such as replacing the components of the embodiment with well-known components.

What is claimed is:

1. Transport equipment comprising:
    an external environment detection sensor which detects electromagnetic waves; and
    a sensor bracket supported by a transport equipment main body, wherein the sensor bracket comprises a sensor hood which surrounds a detection space extending in a detection direction from a detection unit side of the external environment detection sensor, the sensor hood comprising:
        a reflected wave reducing structure which reduces reflected waves reaching the detection unit on at least a portion of a surface facing the detection space, and
        a surface forming part which forms a surface having the reflected wave reducing structure of the sensor hood, comprising:
            a fixed body having a portion of the reflected wave reducing structure and fixed to the transport equipment main body; and
            a segment body having the other portion of the reflected wave reducing structure and configured to be attachable to and detachable from the fixed body.

2. The transport equipment according to claim 1, wherein the transport equipment main body comprises a transmission member disposed in the detection direction of the external environment detection sensor and configured to transmit electromagnetic waves to be detected by the external environment detection sensor, and wherein the sensor hood is disposed on an inner surface of the transmission member and comprises an opening in the detection direction that is closed by the inner surface of the transmission member.

3. The transport equipment according to claim 1, wherein the external environment detection sensor is fixed to the fixed body, wherein the fixed body comprises a first sensor fixing part and a second sensor fixing part which fix the external environment detection sensor, and wherein the segment body is disposed between the first sensor fixing part and the second sensor fixing part.

4. The transport equipment according to claim 1, wherein the external environment detection sensor and the segment body are disposed to overlap each other in a plan view of the surface forming part.

5. The transport equipment according to claim 3, wherein the segment body is attached to the fixed body from a back surface side of the surface forming part, wherein the first sensor fixing part comprises a first wall part extending to the back surface side of the surface forming part, wherein the second sensor fixing part comprises a second wall part extending to the back surface side of the surface forming part, and wherein the segment body is disposed between the first wall part and the second wall part.

6. The transport equipment according to claim 1, wherein the segment body comprises fixed parts fixed to the fixed body, and wherein the fixed parts are formed to be weaker than fixing parts of the fixed body which fix the fixed parts.

7. The transport equipment according to claim 1, wherein the segment body comprises elastic deformation parts which are elastically deformed by being pressed by the fixed body in a state of being attached to the fixed body.

8. The transport equipment according to claim 7, wherein the fixed body comprises protruding parts which press and elastically deform the elastic deformation parts with the segment body attached.

9. The transport equipment according to claim 7, wherein the segment body comprises:
    one side fixed parts which are fixed to the fixed body on one side of the segment body;
    the other side fixed parts which are elastically engaged with and fixed to the fixed body by being pressed from the back surface side of the surface forming part on the other side of the segment body; and
    pressing parts which enable the segment body to be pressed from the back surface side of the surface forming part in order to elastically deform the elastic deformation parts, wherein the elastic deformation parts and the pressing parts are disposed closer to the other side fixed parts than the one side fixed parts are.

10. The transport equipment according to claim 9, wherein the other side fixed parts engage with the fixed body to fix the segment body in a state in which the elastic deformation parts are elastically deformed by pressing of the pressing parts.

11. The transport equipment according to claim 10, wherein the segment body comprises a flat plate part having the reflected wave reducing structure on one surface in a thickness direction, and the elastic deformation parts are provided on protruding wall parts which protrude in the thickness direction from the flat plate part toward the one surface side.

12. The transport equipment according to claim 9, wherein the segment body comprises a flat plate part having the reflected wave reducing structure on one surface in a thickness direction, and the pressing parts are provided to protrude in the thickness direction from the flat plate part toward the back surface side of the surface forming part.

13. The transport equipment according to claim 1, wherein the fixed body comprises a fixed-side opening part which fits and closes the segment body, and an outer peripheral portion of the segment body comprises an overlapping portion which overlaps an inner peripheral portion of the fixed-side opening part from a back surface side of the surface forming part.

14. A sensor bracket supported by a transport equipment main body, the sensor bracket comprising:

a sensor hood which surrounds a detection space extending in a detection direction from a detection unit side of the external environment detection sensor which detects electromagnetic waves, wherein the sensor hood comprises a reflected wave reducing structure which reduces reflected waves reaching the detection unit on at least a portion of a surface facing the detection space, and a surface forming part which forms a surface having the reflected wave reducing structure of the lens hood that comprises:

a fixed body having a portion of the reflected wave reducing structure and fixed to the transport equipment main body; and a segment body having the other portion of the reflected wave reducing structure and configured to be attachable to and detachable from the fixed body.

* * * * *